United States Patent [19]

Diepers et al.

[11] Patent Number: 4,639,811

[45] Date of Patent: Jan. 27, 1987

[54] COMBINED MAGNETIC WRITE AND READ HEAD FOR THE VERTICAL MAGNETIZATION OF A CORRESPONDING RECORDING MEDIUM

[75] Inventors: Heinrich Diepers, Viet-Stoss-Str; Herbert Schewe, Haydnstr, both of Fed. Rep. of Germany

[73] Assignee: Siemens Aktiengesellschaft, Munich, Fed. Rep. of Germany

[21] Appl. No.: 684,055

[22] Filed: Dec. 20, 1984

[30] Foreign Application Priority Data

Dec. 23, 1983 [DE] Fed. Rep. of Germany ....... 3346876

[51] Int. Cl.[4] .......................... G11B 5/127; G11B 5/17
[52] U.S. Cl. .................................. 360/125; 360/123; 360/113
[58] Field of Search ............... 360/123, 125, 111, 119, 360/110, 113

[56] References Cited

U.S. PATENT DOCUMENTS

| | | | |
|---|---|---|---|
| 3,394,361 | 7/1968 | Hahs | 360/125 |
| 3,881,194 | 4/1975 | Heaslett et al. | 360/123 |
| 4,287,544 | 9/1981 | Lazzari | 360/131 |
| 4,317,148 | 2/1982 | Chi | 360/113 |
| 4,404,609 | 9/1983 | Jones, Jr. | 360/123 |
| 4,458,279 | 7/1984 | Katz | 360/123 |

FOREIGN PATENT DOCUMENTS

2924013  1/1980  Fed. Rep. of Germany .
302745   7/1971  U.S.S.R. ............... 360/111

OTHER PUBLICATIONS

Romankiw et al., "Batch Fabrication of Thin Film Magnetic Recording Heads: A Literature Review and Process Description for Vertical Single Turn Heads", IEEE Trans on Magnetics, vol. Mag-11, No. 1, Jan. 1975, pp. 50–55.
Hoagland, "Combined Longitudinal and Vertical Magnetic Recording Head", IBM Tech. Disclosure Bull., vol. 20, No. 8, Jan. 1978, pp. 3311–3312.
"IEEE Transactions on Magnetics", vol. MAG-16, No. 1 (Jan. 1980), pp. 71–76.
"IEEE Transactions on Magnetics", vol. MAG-18, No. 6 (Nov. 1982), pp. 1158–1163, 1170–1172.
"IEEE Transactions on Magnetics", vol. MAG-17, No. 6 (Nov. 1981), pp. 2538–2540, 3120–3122.
"IEEE Transactions on Magnetics" vol. MAG-16, No. 5 (Sep. 1980), pp. 967–972.

Primary Examiner—John H. Wolff
Assistant Examiner—Matthew J. Bussan
Attorney, Agent, or Firm—Kenyon & Kenyon

[57] ABSTRACT

A magnetic head for a recording medium which can be magnetized perpendicularly contains a ring head-like magnetic conduction body for carrying magnetic flux, the conduction body having two magnet legs, the poles of which are arranged one behind the other as seen in the direction of motion of the head and at a predetermined distance from each other. At least one coil winding is associated with the magnet legs, the turns of which extend through a space formed between the magnet legs. With this magnetic head, a switchable write and read function having high efficiency is obtainable. In addition to the mentioned coil winding serving only for executing a read function, an additional coil winding for executing a write function is provided which partly encloses one magnet leg. The other magnet leg has, at least in a subsection, a predetermined small cross section, so that this subsection is driven, at least largely, into magnetic saturation during the write function by means of the additional write coil winding while the read coil winding carries no current. The write function can be performed with the magnetic head as if it is a single-pole head.

11 Claims, 2 Drawing Figures

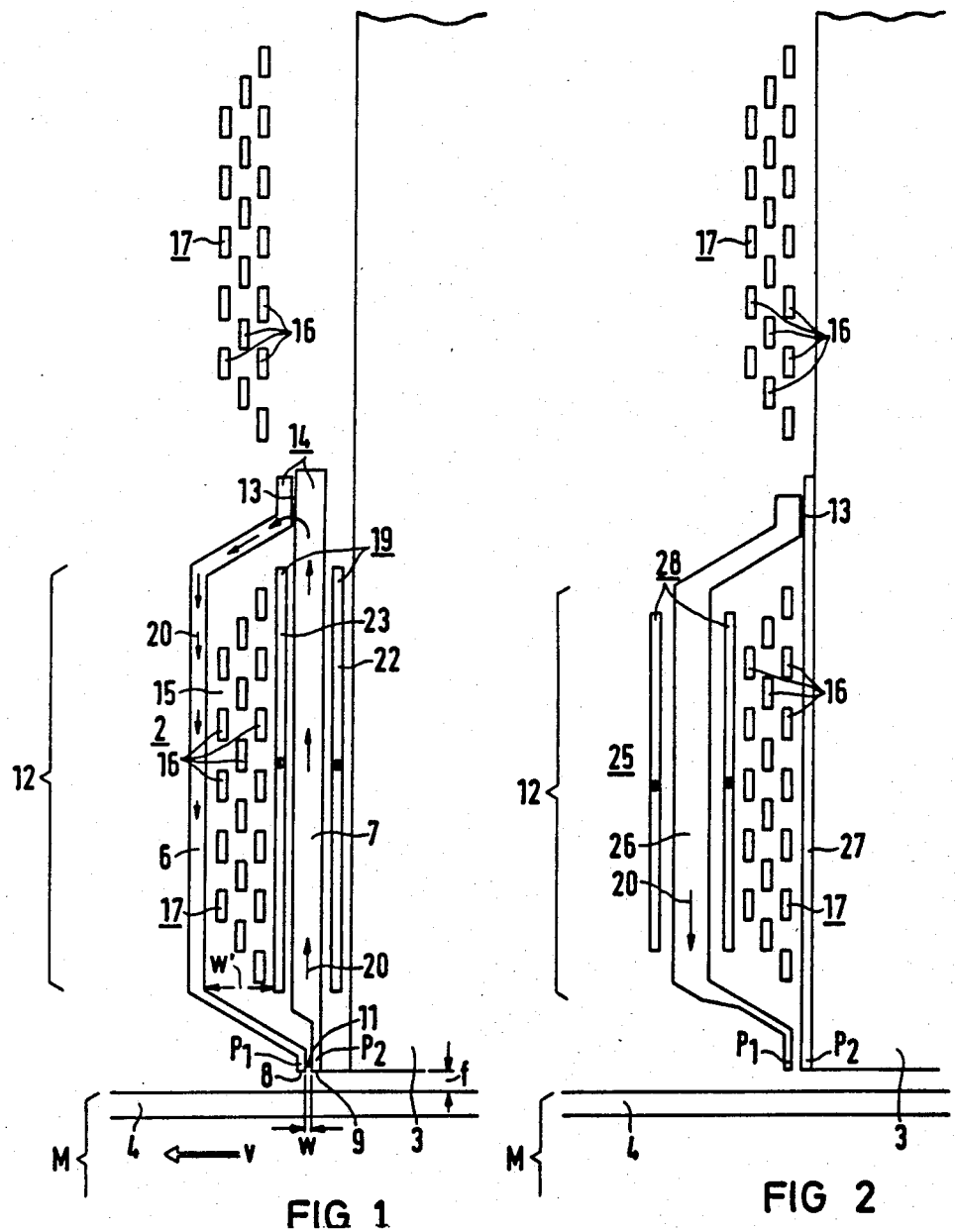

COMBINED MAGNETIC WRITE AND READ HEAD FOR THE VERTICAL MAGNETIZATION OF A CORRESPONDING RECORDING MEDIUM

BACKGROUND OF THE INVENTION

The present invention relates to a combined magnetic write and read head for a recording medium which is provided with at least one magnetizable storage layer, into which information can be written along a track by perpendicular or vertical magnetization of the storage layer. Such magnetic heads comprise a ring-head-like magnetic conduction body for carrying the magnetic flux, the conduction body having two magnet legs, the poles of which are arranged in tandem as viewed in the direction of motion and which are arranged at a predetermined spacing from each other, with at least one coil winding associated therewith, the turns of which extend through a space formed between the magnet legs. Such magnetic heads are described in DE-OS 29 24 013 or U.S. Pat. No. 4,287,544.

The principle of perpendicular magnetization for storing information is generally known. See, for instance, IEEE Transactions on Magnetics, vol. MAG-16, no. 1, January, 1980, pages 71 to 76, or the above mentioned patent literature. For this principle, which is frequently also called vertical magnetization, special recording media in the form of rigid magnetic storage discs, flexible individual discs (floppy discs) or magnetic tapes are required. Such a recording medium has at least one magnetizable storage layer of predetermined thickness which contains a magnetically anisotropic material, especially of a CoCr alloy. The axis of the so-called easy direction of a magnetization of this layer is oriented perpendicularly to the surface of the medium. By means of a special magnetic head, the individual bits of information are then written along a track in successive sections, also called cells or blocks, by suitable magnetization of the storage layer. In practice, the changes of the magnetic flux, i.e., the transitions from one direction of magnetization to the opposite one, are used as information. The sections have a predetermined dimension in the longitudinal direction of the track, also called wavelength. This dimension can be substantially smaller than the limit which is given, in the method of longitudinal or horizontal storage, by demagnetization. Thus, the information density in the recording medium can be increased advantageously by the principle of vertical magnetization.

However, the write and read heads known for the principle of longitudinal magnetization, i.e., heads with which the write as well as read function can be carried out, cannot be used directly for vertical magnetization. If these heads are used, which generally have a ring-like shape, in fact the flux conduction which is also desired with the principle of vertical magnetization, to form a circuit closed as far as possible and with low magnetic resistance, can be achieved, but writing of both poles of these ring heads can hardly be suppressed, so that corresponding difficulties in reading the recorded information result.

One is therefore compelled to develop special combined write-read heads for the principle of vertical magnetization. A magnetic head suitable for this purpose has in general a so-called main pole, by which a vertical magnetic field strong enough for reversing the magnetization of the individual sections of the storage layer is produced. The necessary magnetic return path can then be accomplished, for instance, by a so-called auxiliary pole on the opposite side of the recording medium. See the mentioned literature reference, IEEE Trans. Magn. vol. MAG-16. In addition, a return by a stray flux also is known. See IEEE Trans. Magn., vol. MAG-18, no. 6, November, 1982, pages 1170 to 1172. A magnetic return can further be accomplished by a separate auxiliary pole which is located on the same side as the main pole. See IEEE Trans. Magn., vol. MAG-17, no. 6, November, 1981, pages 3120 to 3122 or vol. MAG-18, no. 6, November, 1982, pages 1158–1162, or the mentioned patent literature. Accordingly, the magnetic write and read head known from the above patent literature contains at its front, as seen in the direction of motion of the recording medium moving under it, the auxiliary pole and on its back side the main pole proper. This main pole is formed by a magnet leg which comprises substantially a magnetic layer which extends perpendicularly to the direction of motion and which is applied to a nonmagnetic substrate. The auxiliary pole, which is substantially longer in the direction of motion and which is located in front of the main pole, is formed by a magnet leg which is composed of several magnetic layers arranged perpendicularly to the direction of motion with interposed insulating layers. Between this auxiliary pole, which thus covers a comparatively much larger area of the track as the main pole, a space or air gap, several $\mu m$ wide, is formed. In this air gap is disposed an electric winding, by which the main pole can be excited for the write function, and the excitation of the main pole can be registered for the read function. Because of the relatively large write current required, this winding must have accordingly large conductor cross sections, however. Since, however, the space between the main and the auxiliary pole is very small, the number of turns of the winding and consequently, the read voltage, are limited accordingly. The auxiliary pole should in any case serve only for returning the magnetic flux. A possible concurrent writing of the auxiliary pole can possibly be tolerated, since the recording main pole always lags it and therefore overwrites information which may have been written by the auxiliary pole. However, it is a prerequisite that the width of the auxiliary pole be not greater than that of the main pole and therefore, already written adjacent tracks remain uninfluenced. With this known magnetic head, also a relatively large width of the air gap is called for as compared to the main pole, besides the larger cross section of the auxiliary pole as compared to the main pole, so that a far-reaching reduction of the magnetic flux density at the auxiliary pole can be assured. Even so, the air gap of the known magnetic head cannot be made so wide that concurrent reading of the auxiliary pole by its trailing edge can be suppressed completely. This can lead to difficulties in information detection.

The remaining space of the air gap which is not filled by the electric winding in the known magnetic head and which faces the recording medium must be filled with a so-called insulating gap layer. This gap layer should comprise material as hard as possible such as $Al_2O_3$ in order to avoid notches or washouts during the manufacture of the head, since such unevenesses can lead to crashing of the magnetic head, which is guided above the recording medium with extremely little spacing, by embedded dirt particles. However, it has been found that this gap layer between the main and the auxiliary pole is extremely difficult to make if relatively large gap widths are required, as with the known magnetic head.

Due to the difficulties encountered with the principle of vertical magnetization in reading with the known combined write and read heads, it has been proposed to carry out the write and read functions also with separate heads, so that these heads can be adapted optimally to the respective function. See, for instance, IEEE Trans. Magn., vol. MAG-16, no. 5, September, 1980, pages 967 to 972. For reading, the ring heads known per se from the principle of vertical magnetization can be used, while writing can be carried out with special heads. Such a write head has, for instance, on its side facing the storage layer of the recording medium, a main pole, also called a single-pole head, with a longitudinal dimension of, for instance, 3 $\mu$m, opposite which is located on the back side of the recording medium a substantially larger auxiliary pole. The second head, which is required only for reading, is a known ring head and has a gap width of, for instance, 0.2 $\mu$m. See, IEEE Trans. Magn., vol. MAG-17, no. 6, November, 1981, pages 2538 to 2540. Such systems for reading and writing with separate, special heads adapted to the respective function, however, are relatively elaborate as far as the mechanical design is concerned.

SUMMARY OF THE INVENTION

It is therefore an object of the present invention to improve the combined magnetic write and read head mentioned above such that a switchable write and read function with respectively high efficiency according to the principle of vertical magnetization can be obtained.

The above and other objects of the present invention are achieved by a combined magnetic write and read head for a recording medium, the recording medium being provided with at least one magnetizable storage layer into which information can be written along a track by perpendicular magnetization of the storage layer, the magnetic head being provided with a coil winding serving for executing a read function and an additional coil winding for executing a write function, the additional coil winding at least partially surrounding one magnet leg of a ring-shaped flux conduction body, and having another magnet leg having, at least in a subsection, a predetermined small cross section, so that this subsection is driven, at least largely, into magnetic saturation during the write function by means of the additional write coil winding while the read coil winding remains deenergized.

The advantages connected with this design of the magnetic head are seen particularly in the fact that the subsection of the one magnet leg which is driven into saturation for the write function by a relatively large write current in the additional coil winding acts like a block for the magnetic flux in this leg. Thus, this magnet leg practically does not participate in the write function, i.e., the magnetic head writes advantageously only with the other magnet leg into the recording medium as a quasi single-pole head. The other coil winding, serving as the read coil, remains without current. Its winding part extending between the two magnet legs through the space between the two magnet legs is advantageously in a space free of the magnetic field. For reading with the magnetic head according to the principle of vertical magnetization, the additional write coil winding remains inoperative. Since flux changes are considerably smaller for reading than for writing, there is no danger that the magnet leg with the smaller cross section is magnetically saturated. The magnetic head according to the invention can therefore be operated for the read function as a ring head in a manner known per se.

In addition, the spacing between the pole ends of the magnet legs facing the recording medium can advantageously be kept very small, so that the magnetic head according to the invention exhibits correspondingly good read properties. The danger of washouts of the gap formed between these ends is precluded, at least to a high degree.

In addition, the number of turns of the read coil winding can advantageously be increased considerably in the magnetic head according to the invention due to the separation of the write and read coil windings, and thereby, a sufficiently high read voltage can be generated without making the coil fabrication technology appreciably more difficult. For example, the cross section of the read coil winding, and especially its coil thickness, are distinctly smaller than in the known write/read heads, so that a corresponding simplification of the fabrication technology is achieved. In addition, the required magnetic field can be realized with high efficiency by the arrangement of the write coil winding.

BRIEF DESCRIPTION OF THE DRAWINGS

The invention will be described in greater detail in the following detailed description with reference to the drawings in which:

FIG. 1 shows a first embodiment of a magnetic head according to the invention in a longitudinal section; and FIG. 2 shows a second embodiment, also in a longitudinal section.

DETAILED DESCRIPTION

In the combined magnetic write and read head according to the invention shown, ring-head-like embodiments, known per se, according to the principle of perpendicular or vertical magnetization are taken as a starting point. The head, which is designated in general with 2 in FIG. 1 and is shown, for instance, during its writing function, is located on a flat side of a substrate body 3 which forms, for instance, the end face or the rear side of a customary element called a flying body, and is indicated in FIG. 1 only as a part. This head can be guided relative to a recording medium M known per se which is to be magnetized vertically along a track at a small flying height f of, for instance, 0.2 $\mu$m above a storage layer 4 of the medium. For instance, the recording medium may be guided underneath the head. The direction of motion of the recording medium relative to the magnetic head 2 is indicated by an arrow v.

The magnetic head 2 has two magnet legs 6 and 7 which are oriented largely and in particular at their ends 8 and 9 facing the recording medium at least approximately perpendicularly to the surface of the recording medium and which form respective magnet poles $P_1$ and $P_2$. Between these two leg ends, an air gap 11 is formed with an advantageously small width w of less than 1 $\mu$m, and in particular, less than 0.3 $\mu$m. i.e., pointing in the direction of motion v. In a central region 12 of the magnetic head 2, the spacing between the two magnet legs 6 and 7 is made wider than the gap width w, in that, for instance, the magent leg 6 which is behind relative to the direction of motion, leads in this region to a larger spacing w' with respect to the straight magnet leg 7 at the front. Outside this region and on the side facing away from the recording medium M, the magnet legs 6 and 7 are joined together again in a connecting region 13 in a manner known per se. The two magnet legs thus form a conductio body 14 for carrying the magnetic flux and have a ring head-like shape. Through the space 15 formed in the central region 12 between the two magnet legs 6 and 7, the turns 16 of, for instance, a three-layer flat coil winding 17 extend, which serves as a read coil. Coil winding 17, however, remains without current for the write function assumed in FIG. 1. During this function, the read coil winding 17 is advantageously shunted at its ends by a sufficiently low resistance in order to assure that a connected read amplifier is not damaged by induced voltage spikes.

For the write function, an additional coil winding 19 is provided according to the invention which encloses one of the two magnet legs 6 and 7, for instance the leg 7 closest to the substrate 3, at least in part, for instance, in its region 12. This additional coil winding 19 is formed, for instance, by a single wide coil loop or also by several turns. With an existing write current which is indicated by the current-flow direction symbols shown and which is comparatively large, it should be possible, according to the invention, to drive the other magnet leg 6 into magnetic saturation, at least in a subsection. For this purpose, magnet leg 6 has an accordingly smaller cross section of its material carrying the magnetic flux, so that it then acts like a magnetic block for the magnetic flux generated by the coil winding 19 associated with the magnet leg 7. This blocking action is indicated in FIG. 1 by arrows 20 which are shown as becoming increasingly shorter toward the bottom of the leg 6. At the end 8 of the magnet leg 6 having the relatively small cross section, only an at most minimal magnetic flux exists, so that the write function at the pole $P_2$ is executed practically only by the magnetic flux 20 of the magnet leg 7. The magnetic head 2 according to the invention therefore writes advantageously like a single-pole head. Except for this write function, however, the coil winding 19 remains without current, so that then the magnetic head 2 with the read coil winding 17 is operated as an ordinary ring head. Magnetic saturation effects in the magnet leg 6 are not possible then because, for this function, the magnetic flux is very small.

For manufacturing the magnetic head 2 by thin-layer or thin-film technology, a flying body with a substrate is generally used which comprises for instance, TiC or $Al_2O_3$. Optionally, the corresponding substrate body 3 further can be provided with a sufficiently thick insulating layer, for instance, of $Al_2O_3$. For building up the magnet legs 6 and 7, magnetic layers 1 to 5 $\mu$m thick, for instance, of special NiFe alloys such as permalloy (Ni/Fe-81/19) or of magnetically soft amorphous materials such as FeB are applied by sputtering, vapor deposition or electroplating and separated by nonmagnetic spacers, for instance, of $SiO_2$ or $Al_2O_3$ from each other. The magnetization of these magnetic layers lies in the plane of the layer. Due to the manufacturing process, the magnetic layers exhibit uniaxial anistropy, i.e., every magnetic layer has two anisotropic axes rotated by 90°, which are designated as the easy and hard directions of magnetization. The magnetization is preferably parallel or antiparallel to the easy direction. The easy direction of magnetization can be induced by an applied magnetic field, for instance, when the respective layer is being deposited. Generally, it is always perpendicular to the direction of the mangnetic flux in the conduction body 14, i.e., it is substantially parallel to the surface of the recording medium M in the vicinity of the magnetic poles $P_1$ and $P_2$. The different grown layers are structured by techniques known per se such as photo lithography, plasma-, ion beam or wet-chemistry etching, and the two magnet legs of the head are formed thereby.

For building up the magnetic head 2, a lower part of the additional coil winding 19 serving as the write coil is first formed on the substrate body 3 or its insulating layer by depositing a layer, for instance, 3 $\mu$m thick of Cu or Al or Au and appropriately structured. On this winding part 22 having a relatively large conductor cross section, a further insulating layer is deposited before the layers of the first magnet leg are applied. This magnet leg is relatively thick in the vicinity 12 of the coil winding 19, for instance, 2 to 4 $\mu$m thick and is tapered toward the pole tip $P_2$ to about 0.2 to 1 $\mu$m. The magnet leg 7 is then coated with an insulation and gap layer except for the junction point 13 with the second magnet leg 6. This gap layer advantageously comprises a hard material such as $Al_2O_3$.

After the first magnet leg 7 and the gap layer are completed, the upper part 23 of the additional coil winding 19 is then formed, structured and connected to the lower part 22 to form the single winding loop of the coil winding 19 with a comparatively large conductor cross section. Subsequently, the individual turns 16 of the winding 17 serving as the read coil are prepared likewise by a thin-layer technique and structured. Since the currents induced in the winding 17 are very small, the conductor cross section practically need not be fixed by the electric loading. For manufacturing reasons, extremely small thicknesses and very fine structures will be avoided, however. The turns comprising, for instance, Cu, Au or Al of this winding, assumed to have three layers, may have, for instance, cross sections of 0.1 $\mu$m by 3 $\mu$m and are embedded in a special levelling material. This material can be a synthetic varnish, for instance, of the polyimide type.

This is followed by the application and structuring of the second laminated magnet leg 6. This magnet leg is so thin, for instance, only 0.5 to 2 $\mu$m thick, that it is driven into magnetic saturation when writing by means of the coil winding 19. Its magnetic layers are separated from the magnet leg 7 in the vicinity of the gap 11 only via the gap layer, and in the central region 12 additionally via the levelling layers with the embedded turns 16 of the coil winding 17. In the vicinity of the junction point 13, both magnet legs 6 and 7 are joined together, so that a ring-head-like shape of the magnetic head is obtained.

Lastly, a relatively thick protective layer, for instance, of $Al_2O_3$ is applied for protecting the so produced magnetic thin-film head 2.

A further embodiment of a magnetic head 25 according to the invention is shown schematically in FIG. 2. Head 25 corresponds in large part to the embodiment according to FIG. 1. Identical parts in the figures are provided with the same reference symbols. The magnetic head 25 differs from the magnetic head 2 shown in FIG. 1 substantially only by the fact that the writing is performed with the pole tip $P_1$ of its outer magnet leg 26. Magnetic leg 26 therefore has a larger cross section than magnet leg 27 directly arranged on the substrate body 3 or its insulating layer. Magnet leg 27 is driven into magnetic saturation during the write function is the additional write coil winding 28 which surrounds the outer magnet leg 26, at least in part. It is a special advantage of this embodiment of the magnetic head 25 that its read coil winding 17 is built-up over the thin magnet leg 27, so that the levelling of the individual coil planes is possible in a particularly simple manner.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A combined magnetic write and read head for a recording medium, the recording medium being provided with at least one magnetizable storage layer into which information can be written along and read from a track by perpendicular magnetization of the storage layer, said magnetic head comprising a ring-shaped magnetic conduction body for carrying magnetic flux having two magnet legs, the magnet legs each having a pole at ends of the magnet legs facing the medium and which are arranged adjacently one behind the other in a direction of relative motion of the head and medium and at a predetermined distance from each other, at least one read coil winding being associated with said magnetic conduction body, the turns of the read coil winding extending through a space formed between the magnet legs, said read coil winding serving for executing a read function, an additional coil winding being provided for executing a write function, said additional coil winding at least partially surrounding one of said magnet legs, the other of said magnet legs having, at least in a subsection thereof, a predetermined small cross section relative to a cross section of said one of said magnet legs, whereby said subsection is driven at least largely into magnetic saturation, as a result of the difference in said cross sections of said magnet legs, during the write function by said additional write coil winding while the read coil winding is deenergized.

2. The magnetic head recited in claim 1, wherein said magnetic conduction body comprises, at least partially, a thin-layer structure having a flat side provided with an insulating layer, and being deposited on a flat substrate body in a plurality of layers.

3. The magnetic head recited in claim 2, wherein both said coil windings partly surround the magnetic conduction body and comprise thin-layer structures.

4. The magnetic head recited in claim 3, wherein the read coil winding comprises an at least largely multilayer structure.

5. The magnetic head recited in claim 1, wherein said magnetic conduction body comprises, at least partially, a magnetically soft material.

6. The magnetic head recited in claim 1, wherein said magnetic conduction body comprises a material having an easy and a hard direction of magnetization, the easy direction of magnetization being oriented at least largely, perpendicularly to the direction of the magnetic flux.

7. The magnetic head recited in claim 1, wherein the predetermined distance between ends of the poles of the magnet legs facing the recording medium is at most 1 $\mu$m.

8. The magnetic head recited in claim 1, wherein an enlarged space is provided between the magnet legs, the distance between the legs in the enlarged space being greater than the predetermined distance between the poles facing the recording medium, the turns of the read coil winding, being disposed in said enlarged space.

9. The magnetic head recited in claim 1, wherein the additional write coil winding comprises a single coil loop disposed around one of said magnet legs, said coil loop substantially covering the area of said one magnet leg.

10. The magnetic head recited in claim 1 wherein the additional write coil winding has several turns.

11. The magnetic head recited in claim 1 wherein the read coil winding is shunted during the write function by a resistor having a predetermined low resistance value.

* * * * *